(12) United States Patent
Matsumoto

(10) Patent No.: US 8,218,185 B2
(45) Date of Patent: Jul. 10, 2012

(54) INFORMATION PROCESSING APPARATUS AND INFORMATION PROCESSING METHOD

(75) Inventor: Tetsuya Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 12/479,026

(22) Filed: Jun. 5, 2009

(65) Prior Publication Data

US 2009/0303537 A1    Dec. 10, 2009

(30) Foreign Application Priority Data

Jun. 6, 2008 (JP) ................................ 2008-148958

(51) Int. Cl.
*G06F 3/12* (2006.01)
*G06K 15/00* (2006.01)
(52) U.S. Cl. ........................................ 358/1.15; 358/2.1
(58) Field of Classification Search .............. 358/1.15, 358/2.1, 1.6, 500, 1.1, 522, 523
See application file for complete search history.

(56) References Cited

U.S. PATENT DOCUMENTS

2009/0303533 A1 * 12/2009 Floros ........................ 358/1.15

FOREIGN PATENT DOCUMENTS

| JP | 2003-005943 A | 1/2003 |
| JP | 2004-289642 A | 10/2004 |

* cited by examiner

*Primary Examiner* — Jerome Grant, II
(74) *Attorney, Agent, or Firm* — Canon USA, Inc., IP Division

(57) ABSTRACT

When a user selects an existing image forming apparatus and a virtual image forming apparatus, a job log acquisition unit acquires a job log from the selected existing image forming apparatus. A simulation unit calculates a processing speed of the existing image forming apparatus and a processing speed of the virtual image forming apparatus. The simulation unit performs job processing using the virtual image forming apparatus, and acquires a job log. The simulation unit compares the job log of the existing image forming apparatus and the job log of the virtual image forming apparatus, calculates a replacement effect, and outputs the replacement effect.

7 Claims, 20 Drawing Sheets

| ID | JOB TYPE | USER NAME | NUMBER OF SHEETS TO PRINT | NUMBER OF COPIES TO PRINT | PROCESSING START TIME | PROCESSING END TIME |
|---|---|---|---|---|---|---|
| 1 | Print | USER A | 10 | 5 | 2007/11/10 12:00:00 | 2007/11/10 12:00:50 |
| 2 | Print | USER B | 1 | 10 | 2007/11/10 12:01:50 | 2007/11/10 12:02:01 |
| 3 | Copy | USER C | 3 | 1 | 2007/11/10 12:10:12 | 2007/11/10 12:10:18 |
| 4 | Print | USER A | 15 | 30 | 2007/11/10 12:15:02 | 2007/11/10 12:21:50 |
| 5 | Copy | USER C | 30 | 20 | 2007/11/10 12:17:00 | 2007/11/10 12:25:37 |
| ... | ... | ... | ... | ... | ... | ... |

JLT

FIG. 8

| IMAGE FORMING APPARATUS | TWO-SIDED | COLOR | COPY | FAX | FINISHING ||| PROCESSING SPEED ||||
|---|---|---|---|---|---|---|---|---|---|---|---|
| | | | | | STAPLING | BOOKBINDING | PUNCHING | JOB TYPE | COLOR | PAPER SIZE | PPM |
| IMAGE FORMING APPARATUS A | ○ | ○ | ○ | × | ○ | ○ | × | Print | MONOCHROME | A3 | 23 |
| | | | | | | | | | | B4 | 23 |
| | | | | | | | | | | A4 | 45 |
| | | | | | | | | | | B5 | 45 |
| | | | | | | | | | COLOR | A3 | 20 |
| | | | | | | | | | | B4 | 20 |
| | | | | | | | | | | A4 | 40 |
| | | | | | | | | | | B5 | 40 |
| | | | | | | | | COPY | ⋯ | ⋯ | ⋯ |
| IMAGE FORMING APPARATUS B | ⋯ | ⋯ | ⋯ | ⋯ | ⋯ | ⋯ | ⋯ | ⋯ | ⋯ | ⋯ | ⋯ |

FTAB

FIG. 9

| USER NAME | IMAGE FORMING APPARATUS A | IMAGE FORMING APPARATUS B | IMAGE FORMING APPARATUS C | IMAGE FORMING APPARATUS D | IMAGE FORMING APPARATUS E |
|---|---|---|---|---|---|
| USER X | 1 | 2 | 3 | × | × |
| USER Y | 2 | 1 | × | 3 | × |
| USER Z | 2 | 1 | × | × | 3 |
| ... | ... | ... | ... | ... | ... |

FIG. 12A

| 1201 | IMAGE FORMING APPARATUS | PROCESSING TIME | TOTAL PROCESSING TIME | WAITING TIME | TOTAL WAITING TIME |
|---|---|---|---|---|---|
| BEFORE REPLACEMENT | IMAGE FORMING APPARATUS A | 80 HOURS | 150 HOURS | 53 HOURS | 98 HOURS |
| | IMAGE FORMING APPARATUS B | 70 HOURS | | 45 HOURS | |
| AFTER REPLACEMENT | IMAGE FORMING APPARATUS X | 30 HOURS | 112 HOURS | 10 HOURS | 43 HOURS |
| | IMAGE FORMING APPARATUS Y | 46 HOURS | | 20 HOURS | |
| | IMAGE FORMING APPARATUS Z | 36 HOURS | | 13 HOURS | |
| REPLACEMENT EFFECT | INCREASE/DECREASE | | −38 HOURS | | −55 HOURS |
| | COST EFFECT | | ¥76,000 | | ¥110,000 |

FIG. 14

| JOB TYPE | COLOR MODE | SHEET | RATIO |
|---|---|---|---|
| Print | MONOCHROME | A3 | 0.45 |
| | | A4 | 0.5 |
| | COLOR | A3 | 0.63 |
| | | A4 | 0.7 |
| Copy | ⋮ | ⋮ | ⋮ |
| Scan | ⋮ | ⋮ | ⋮ |
| Fax | ⋮ | ⋮ | ⋮ |
| ⋮ | ⋮ | ⋮ | ⋮ |

FIG. 15

| VIRTUAL IMAGE FORMING APPARATUS | JOB TYPE | COLOR MODE | SHEET | PROCESSING SPEED OF VIRTUAL IMAGE FORMING APPARATUS |
|---|---|---|---|---|
| VIRTUAL IMAGE FORMING APPARATUS A | Print | MONOCHROME | A3 | 12.7 |
| | | COLOR | A4 | 18 |
| | Copy | ... | A3 | 10 |
| | Scan | ... | A4 | 14 |
| | Fax | ... | ... | ... |
| | ... | ... | ... | ... |
| VIRTUAL IMAGE FORMING APPARATUS B | | | | |

FIG. 17

| USER NAME | NUMBER OF SHEETS × NUMBER OF COPIES | SELECTION RATE OF FASTEST IMAGE FORMING APPARATUS |
|---|---|---|
| USER A | 1~5 | 10% |
| | 6~10 | 20% |
| | 11~20 | 40% |
| | 21~30 | 50% |
| | 31~40 | 60% |
| | ... | ... |
| USER B | | |
| ... | | |

FIG. 19

STORAGE MEDIUM SUCH AS FD, CD-ROM

| DIRECTORY INFORMATION |
| --- |
| PROGRAM CODE CORRESPONDING TO STEPS OF FLOWCHART ILLUSTRATED IN FIG. 10 |
| PROGRAM CODE CORRESPONDING TO STEPS OF FLOWCHART ILLUSTRATED IN FIG. 13 |
| PROGRAM CODE CORRESPONDING TO STEPS OF FLOWCHART ILLUSTRATED IN FIG. 16 |
| PROGRAM CODE CORRESPONDING TO STEPS OF FLOWCHART ILLUSTRATED IN FIG. 18 |

INFORMATION PROCESSING APPARATUS AND INFORMATION PROCESSING METHOD

BACKGROUND OF THE INVENTION

1. Field of the Invention

The present invention relates to a method for simulating replacement of image forming apparatuses.

2. Description of the Related Art

There is a service to analyze output conditions of image forming apparatuses installed in a customer's office and to make a proposal on the performances, number, and arrangement of image forming apparatuses that are appropriate for the customer based on the analysis. One method for providing the service includes installing a new image forming apparatus in a customer's office as a test, comparing output conditions of an existing image forming apparatus with those of the new image forming apparatus, and calculating the expected reduction of processing time and cost.

However, this method may be time-consuming and troublesome due to the need to install an actual machine as a test.

There is a technique to simulate an installation area so as to efficiently use image forming apparatuses based on the usage status of existing image forming apparatuses.

Japanese Patent Application Laid-Open No. 2004-289642 discusses a method to make an analysis based on usage records acquired from multifunction peripherals, information of users who use the multifunction peripherals, and location information of client devices, and to calculate an optimal arrangement rate of the multifunction peripherals. In this method, an optimal installation location which minimizes user's operating time and moving distance is analyzed by calculating an optimal arrangement rate when the locations of the multifunction peripherals are changed. Then, the installation location is displayed on an office layout.

Japanese Patent Application Laid-Open No. 2003-005943 discusses a method to calculate an expected processing time of a printer for a print job using a standard processing time for a print job. This method uses, as the standard processing time for a print job, for example, a processing time for the first page and a processing time for the second and subsequent pages when an output destination printer name, color mode, paper size, and N-up are used as an index.

In the above-mentioned service which proposes image forming apparatuses suitable for a user, it is also very important to show advantages when replacing an existing image forming apparatus by an image forming apparatus having different performances.

However, in the above-mentioned conventional methods, an analysis of a case where an existing image forming apparatus is replaced by an image forming apparatus having different performances cannot be performed. Information which can be acquired from the existing image forming apparatus cannot be directly used to show the advantages when replacing an existing image forming apparatus by an image forming apparatus having different performances. For example, a processing time to be shortened must be calculated even for the same processing.

However, since an actual processing speed of an image processing apparatus depends on characteristics (the number and complexity of characters, graphics, and the like) of the original document to be actually processed, the user environment must also be considered in addition to product specifications.

In addition, in an image forming apparatus simulation, it is more effective if a simulation in which a number of new image forming apparatuses having different performances and functions are installed instead of existing image forming apparatuses can be performed. In such a case, a tendency of criterion with which the user usually selects and uses image forming apparatuses needs to be reflected in the simulation.

SUMMARY OF THE INVENTION

The present invention is directed to a method for simulating replacement of image forming apparatuses, considering an environment of a customer's office, based on an actual processing speed of an existing image forming apparatus.

According to an aspect of the present invention, an information processing apparatus for performing, in a system including an image forming apparatus, a simulation of a case where the image forming apparatus is replaced by another image forming apparatus is provided. The information processing apparatus includes a storage unit configured to store a specified processing speed, which is a job processing speed specified in a product specification, for each of a plurality of image forming apparatuses, an acquisition unit configured to acquire a job log of the image forming apparatus included in the system, a calculation unit configured to calculate an actual job processing speed of the image forming apparatus included in the system based on the job log acquired by the acquisition unit, a ratio calculation unit configured to calculate a ratio between the specified processing speed stored in the storage unit and the actual job processing speed calculated by the calculation unit, of the image forming apparatus included in the system, a correction unit configured to acquire a specified processing speed of the another image forming apparatus usable for replacement in the simulation from the storage unit and to correct the acquired specified processing speed using the ratio calculated by the ratio calculation unit, a processing unit configured to perform a simulation in which a job based on the job log acquired by the acquisition unit is processed at the specified processing speed of the another image forming apparatus corrected by the correction unit, a log storage unit configured to store a result of the simulation performed by the processing unit as a job log, and an output unit configured to output an analysis result of analyzing the job log acquired by the acquisition unit and an analysis result of analyzing the job log stored by the log storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a job log table stored in a job log management unit illustrated in FIG. 5.

FIG. 8 illustrates an example of performance information of the image forming apparatuses, which is stored in a performance information management unit illustrated in FIG. 7.

FIG. 9 illustrates an example of user information stored in a user information management unit illustrated in FIG. 7.

FIG. 14 illustrates average values of ratios between a specified processing speed and an actual processing speed of an existing image forming apparatus.

FIG. 15 illustrates an example of corrected processing speeds of virtual image forming apparatuses.

FIG. 17 illustrates an example of rates of selecting the fastest image forming apparatus for each user managed by the information processing apparatus according to an exemplary embodiment of the present invention.

FIG. 19 illustrates a memory map of a storage medium storing various data processing programs readable by the information processing apparatus according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
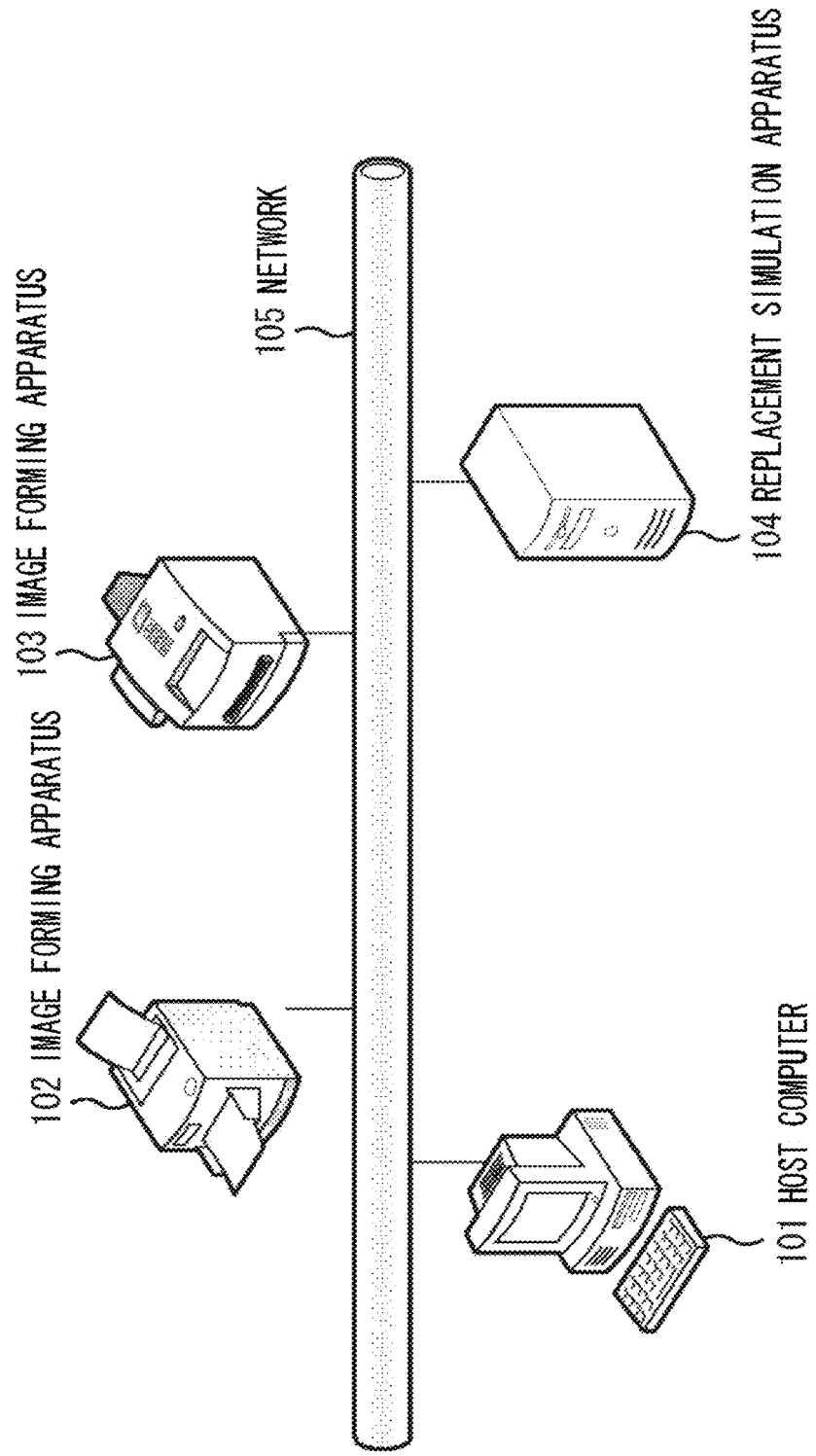
FIG. 1 illustrates a configuration of an information processing apparatus including a replacement simulation apparatus according to an exemplary embodiment of the present invention.

FIG. 1 illustrates a configuration of an information processing system including an information processing apparatus according to an embodiment of the present invention.

The information processing system includes an information processing apparatus which performs a replacement simulation for replacing an image forming apparatus connected to a network by another image forming apparatus. In image forming apparatuses covered by the simulation, for example, a copying machine, a printer, and a multifunction peripheral (MFP) are included. These apparatuses can be combined into an image forming system which performs image forming processing. Also, a function which performs a replacement simulation of an image forming apparatus connected to a network can be installed in an image forming apparatus. In this case, any one of image forming apparatuses may acquire a job log of image forming apparatuses in the system. Here, the job log indicates history information in which setting information of a job executed in the image forming apparatus and the processing result of the job are written. The jobs include a print job, a scan job, a copy job, a facsimile (FAX) job, and a sending (SEND) job for sending e-mail.

In FIG. 1, a host computer 101 generates a print job and the like as a print request based on an instruction from a user. The generated print job is transmitted to an image forming apparatus, at which print processing is executed. The host computer 101 includes hardware resources and software resources, which includes an operating system (OS).

Image forming apparatuses 102 and 103 print on an actual sheet using a known printing technique, such as an electrophotographic technique or an ink jet technique, when receiving a print job via a network 105.

In addition, the image forming apparatus 103 has functions for reading a paper document via a scanner to make a copy, and sending (SEND) input image data by e-mail and the like, for example.

A replacement simulation apparatus 104 performs a replacement simulation for image forming apparatuses in the system.

The host computer 101, the image forming apparatuses 102 and 103, and the replacement simulation apparatus 104 are connected to be communicable with one another by the network 105 based on a known technique such as Ethernet. When a module having a similar function as the replacement simulation apparatus 104 is provided in an image forming apparatus, a network communication between these apparatuses can be considered to be replaced by data transmitting/receiving via a bus and the like.

Figure 2:
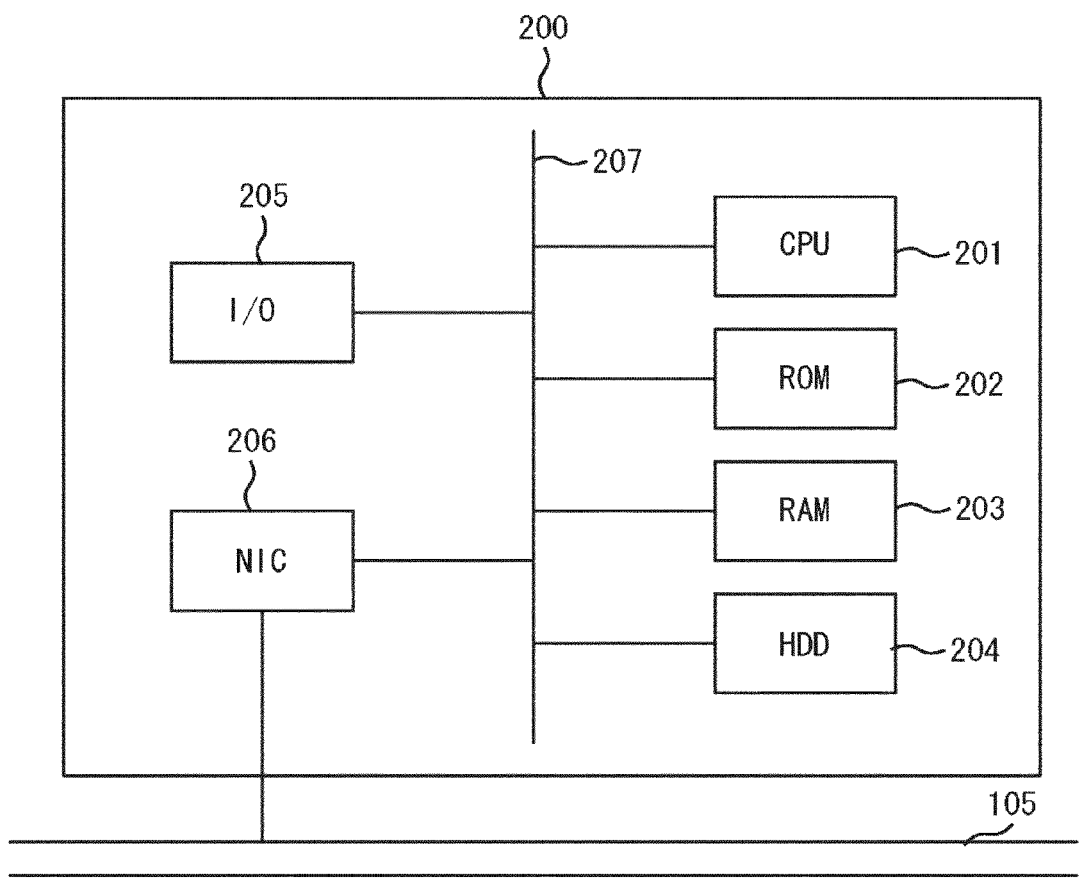
FIG. 2 is a block diagram illustrating a hardware configuration of a host computer and a replacement simulation apparatus illustrated in FIG. 1.

FIG. 2 is a block diagram illustrating a hardware configuration of the host computer 101 and the replacement simulation apparatus 104 illustrated in FIG. 1.

In FIG. 2, an information processing apparatus 200 includes a central processing unit (CPU) 201, which executes software stored in a read-only memory (ROM) 202 or a large scale storage apparatus 204, such as a hard disk and the like. The CPU 201 comprehensively controls each hardware device connected via a bus 207. Hereinafter, the large scale storage apparatus 204 is referred to as a hard disk drive (HDD) 204.

A random access memory (RAM) 203 functions as a main memory and a work area of the CPU 201. An input/output (I/O) controller 205 controls various inputs and displays. A network interface card (NIC) 206 bi-directionally transmits/receives data to and from anther node via the network 105.

Figure 3:
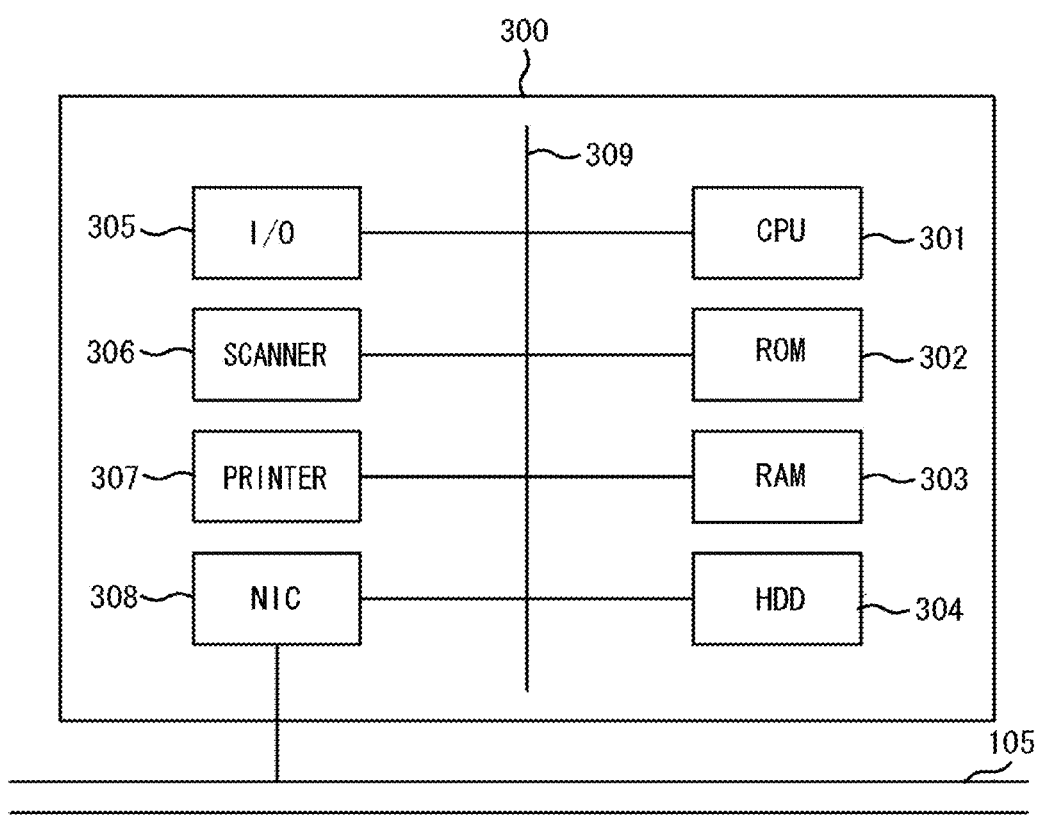
FIG. 3 is a block diagram illustrating an internal configuration of an image forming apparatus illustrated in FIG. 1.

FIG. 3 is a block diagram illustrating an internal configuration of the image forming apparatuses 102 and 103 illustrated in FIG. 1.

In FIG. 3, an information processing apparatus 300 includes a CPU 301, which executes software stored in a ROM 302 or a large scale storage apparatus 304, such as a hard disk and the like. The CPU 301 comprehensively controls each hardware device via a bus 309. Hereinafter, the large scale storage apparatus 304 is referred to as an HDD 304. A RAM 303 functions as a main memory and a work area of the CPU 301.

An I/O controller 305 controls various inputs and displays. A network interface card (NIC) 308 transmits/receives data to and from anther node via the network 105.

An optical scanner 306 is provided to the image forming apparatus, and reads a paper document. A printer 307 is provided to the Image forming apparatus, and prints on an actual sheet using a known printing technique, such as an electrophotographic technique or an ink jet technique. When the printer 307 forms an image, a job history is accumulated in the HDD 304, and the accumulated job history is transmitted to the replacement simulation apparatus 104 in response to a request from the replacement simulation apparatus 104.

The internal configuration of the image forming apparatus can also be considered to be a configuration formed by removing the scanner 306 from the internal configuration of the above mentioned image forming apparatus. In addition, a part or the whole of the I/O controller 305 may be removed from the configuration.

Figure 4:
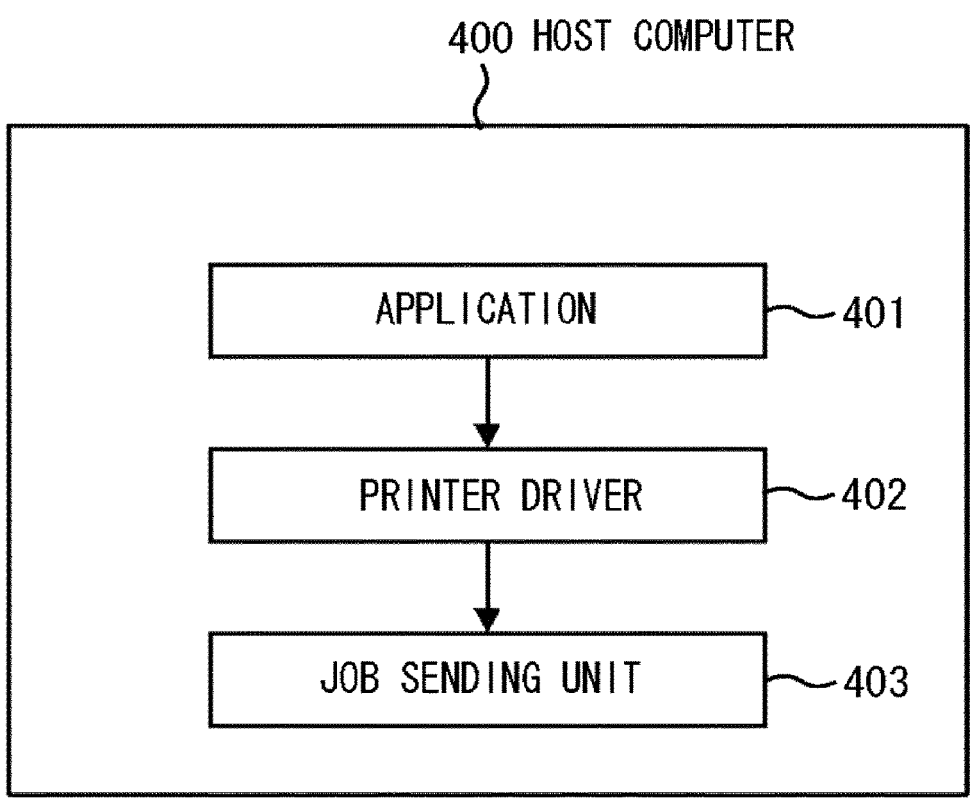
FIG. 4 is a block diagram illustrating a module configuration of the host computer illustrated in FIG. 1.

FIG. 4 is a block diagram illustrating a module configuration of the host computer 101 illustrated in FIG. 1.

In a host computer 400 illustrated in FIG. 4, an application 401 instructs printing, and transmits a drawing instruction and the like to a printer driver 402 to instruct printing.

The printer driver 402 generates a print job using a print control language interpretable by the image forming apparatus, for example, based on the drawing instruction and the like received from the application 401, and transfers the job to a job sending unit 403.

The job sending unit 403 sends the print job received from the printer driver 402 to the image forming apparatus 102 or 103.

Figure 5:
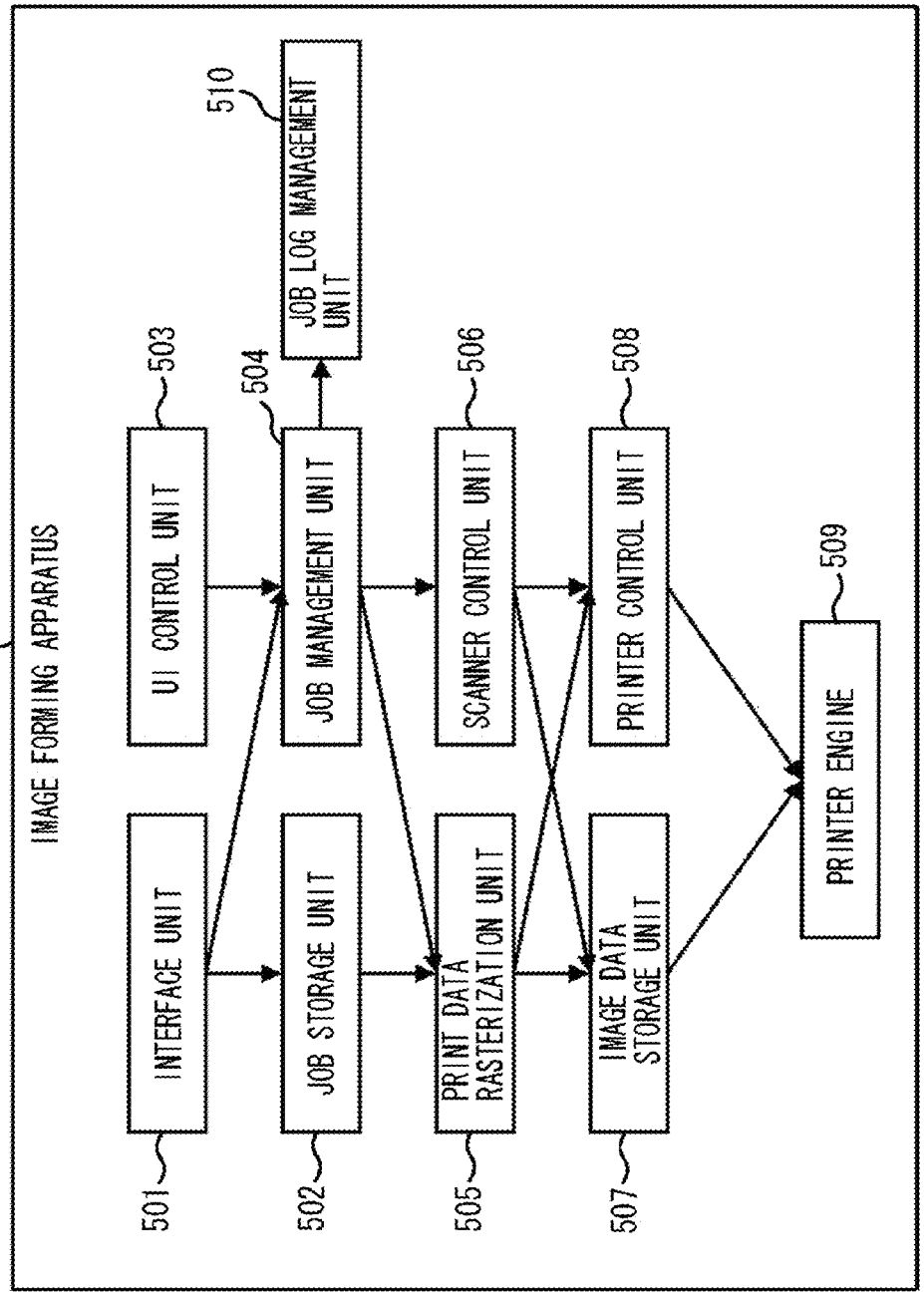
FIG. 5 is a block diagram illustrating a detailed configuration of the image forming apparatus illustrated in FIG. 1.

FIG. 5 is a block diagram illustrating a module configuration of the image forming apparatuses 102 and 103 illustrated in FIG. 1.

In an image forming apparatus 500 illustrated in FIG. 5, an interface unit 501 receives a print job and the like from the host computer 101 via the network 105. A job storage unit 502 temporarily stores the print job and the like.

A UI control unit 503 receives instructions for a copy, scan, and the like from a UI, such as a panel control. A job management unit 504 analyzes a job, acquires output attribute information, such as the number of sheets to print and a color printing and the like, and manages the information as job information.

A print data rasterization unit 505 acquires print data based on the print job from the job storage unit 502 according to the job information stored in the job management unit 504, and performs rasterization processing to generate image data.

A scanner control unit 506 controls the scanner 306 to scan an original document and to generate image data.

An image data storage unit 507 temporarily stores the image data generated by the print data rasterization unit 505 and the scanner control unit 506.

A printer control unit 508 controls a printer engine 509, and instructs printing of the image data stored in the image data storage unit 507.

The printer engine 509 prints the image data stored in the image data storage unit 507 on an actual sheet by using a known printing technique, such as an electrophotographic technique or an ink jet technique.

A job log management unit 510 manages job logs. When a job is completed, the job management unit 504 sends job information corresponding to a processing result of the job as a job log to the job log management unit 510, and the job log is stored in the job log management unit 510. The job log management unit 510 sends the job log in response to a request from the replacement simulation apparatus 104 or on a periodic basis.

A configuration of an image forming apparatus having no scanner can be considered to be a configuration formed by removing the scanner control unit 506 and the UI control unit 503 from the configuration of the image forming apparatus illustrated in FIG. 5.

FIG. 6 illustrates an example of a job log table (JLT) stored in the job log management unit 510 illustrated in FIG. 5.

As illustrated in FIG. 6, in the jog log table according to an exemplary embodiment, for example, information such as a job ID for identifying a job, a user name of a user who requests the job, a type of job, the number of sheets to print, the number of copies to print, a processing start time, a processing end time, and so on are recorded.

Figure 7:
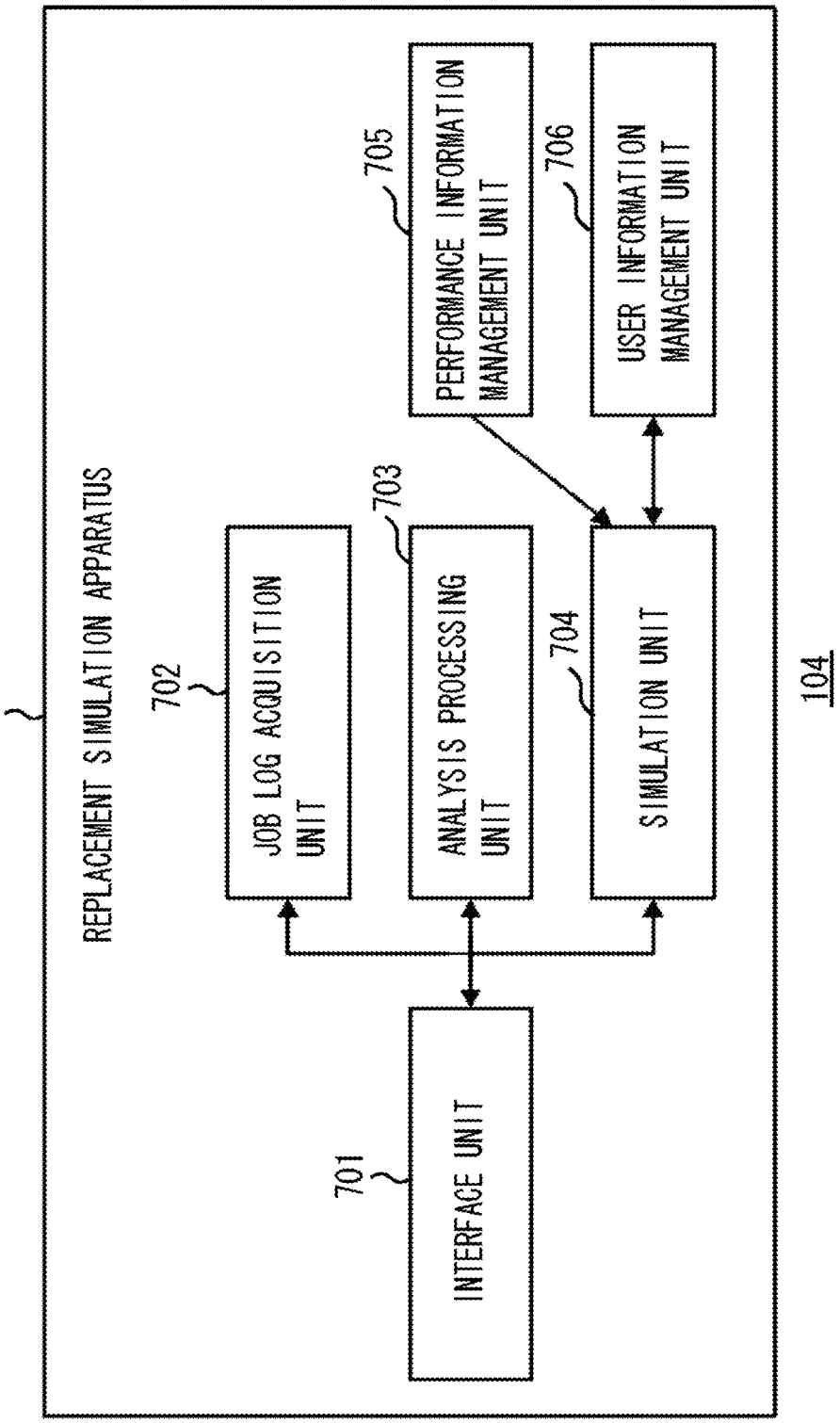
FIG. 7 illustrates a configuration for realizing a replacement simulation function by the replacement simulation apparatus illustrated in FIG. 1.

FIG. 7 is a block diagram illustrating a module configuration for realizing a replacement simulation function by the replacement simulation apparatus 104 illustrated in FIG. 1.

In a replacement simulation apparatus 700 illustrated in FIG. 7, an interface unit 701 communicates with the image forming apparatus 102 or 103 to transmit/receive information via the network 105. A job log acquisition unit 702 communicates with the image forming apparatuses 102 and 103 via the interface unit 701, and acquires a job log from the job log management unit 510. The job log acquired from the image forming apparatuses 102 and 103 is stored in the job log acquisition unit 702 in a format of similar table as the job log table JLT illustrated in FIG. 6 or in a format of a table formed by extending the job log table.

An analysis processing unit 703 performs processing for analyzing the job log acquired by the job log acquisition unit 702 from an image forming apparatus.

A simulation unit 704 performs a simulation of a case where existing image forming apparatuses are replaced by virtual image forming apparatuses. The simulation unit 704 executes the job of the acquired job log based on user information and performance information of the image forming apparatus.

Further, the simulation unit 704 performs processing in which an actual processing speed when executing a job in an existing image forming apparatus in the system and a specified processing speed described in the product specification are compared to calculate the ratio therebetween (details are described below). In addition, the simulation unit 704 performs processing to obtain a processing speed in a case where the virtual image forming apparatus is actually installed, based on the calculated ratio and the specified processing speed of the virtual image forming apparatus. When the simulation unit 704 calculates the ratio, it is useful to obtain the ratios of processing speeds for all related job logs and to use an average value of the ratios.

Furthermore, the simulation unit 704 calculates a processing time, a waiting time, and the like in a case where the acquired job log is performed in the virtual image forming apparatus or the image forming apparatus, by applying the calculated processing speed of the virtual image forming apparatus. The simulation unit 704 displays replacement effects based on the calculated information on a display apparatus included in the replacement simulation apparatus 104. The simulation unit 704 may obtain and output, as replacement effects, a value which can be calculated based on the job log, for example, an operation rate and the like.

The simulation unit 704 may display the replacement effects via a browser of the host computer 101.

The displayed replacement effects show the changes between before and after the replacement, by using any one of the processing time, the waiting time, and the operation rate, or a combination of them. The simulation unit 704 may output cost effects by converting the changes into costs based on the replacement effects.

The operation rate and the waiting time will be briefly described. The operation rate is calculated by a ratio of the processing time of the image forming apparatus in a predetermined time. In the present exemplary embodiment, the operation rate indicates how much time has been used for actually processing the jobs in the image forming apparatus between the earliest start time and the latest end time in the job log.

The waiting time, in the present exemplary embodiment, indicates an estimated time period while the job waits until another job ends in the image forming apparatus. Although there are many calculation methods, any calculation method can be applied. Such method includes a method using a difference between a processing time specified in the product specification and an actual processing time for the job, and a method calculating the waiting time by using an operation rate and an average processing time for the job. If time at which the job is input into the image forming apparatus is managed as a job log separately from the processing start time, the waiting time can be calculated by taking a difference between them.

Furthermore, when the simulation unit 704 is instructed by a user to perform a simulation using a number of virtual image forming apparatuses, the simulation unit 704 performs processing in which selection criteria by which the user selects the apparatuses are reflected in the simulation.

In the present exemplary embodiment, a rate at which the user selects the fastest image forming apparatus having the fastest processing speed, information illustrating whether the user can use the image forming apparatus, information about a distance between the user and the image forming apparatus, and information about the performance of the apparatus are used as the selection criteria. The user may input any value for these criteria. Here, the simulation unit 704 obtains the rate at which the user selects the fastest image forming apparatus as an image forming apparatus which the user selects to process the job by analyzing the job log of an existing image forming apparatus as described below.

A performance information management unit 705 stores performance information of the image forming apparatuses. A user information management unit 706 stores user names, distance information between each user and each existing image forming apparatuses set by an administrator, and information indicating whether each user uses each image forming apparatus.

In the present exemplary embodiment, although the job log acquisition unit 702 is provided in the replacement simulation apparatus which performs a replacement simulation, a module having a similar function as the job log acquisition unit 702 may be provided in a computer, such as a separate job log acquiring apparatus. In this case, a job log acquired by the job log acquiring apparatus is acquired by the replacement simulation apparatus.

FIG. 8 illustrates an example of performance information of the image forming apparatuses, which is stored in the performance information management unit 705 illustrated in FIG. 7.

As illustrated in FIG. 8, the performance information management unit 705 stores a table (FTAB) in which availability information of functions of the image forming apparatuses is stored. For example, the performance information management unit 705 stores availability information of a two-sided printing function, a color function, a copy function, a FAX function, and a finishing function.

Furthermore, the performance information management unit 705 sores a table in which job processing speeds for each of output conditions are stored. These processing speeds indicate processing speeds specified in the product specifications. In this table, the number of pages which can be output in one minute (pages per minute (PPM)) is stored as the processing speed for each of combinations of a type of job, color information, and a paper size.

FIG. 9 illustrates an example of the user information stored in the user information management unit 706 illustrated in FIG. 7.

As illustrated in FIG. 9, the user information management unit 706 stores information of distances between users and the image forming apparatuses as the user information.

The information of distances between users and the image forming apparatuses includes values indicating the order of shorter distance from the desk of a user to an image forming apparatus. In the example illustrated in FIG. 9, regarding a user X, a value 1 is set to the nearest image forming apparatus A, and a value 2 is set to the second nearest image forming apparatus B. Based on office map information, the table can also be created by automatically determining distances between user desks or host computers used by users and image forming apparatuses installed in the office. An administrator and the like may arbitrarily input the distances. Values of the distances (for example, a unit of meter) based on the office map information may be also stored.

Furthermore, the user information management unit 706 stores information of the image forming apparatuses used by a user. In the example illustrated in FIG. 9, "X" is set to the image forming apparatuses not used by a user (or which cannot be used by users). The information of the image forming apparatuses used by a user may be set by determining from the job log, instead of being set by the administrator.

Figure 10:
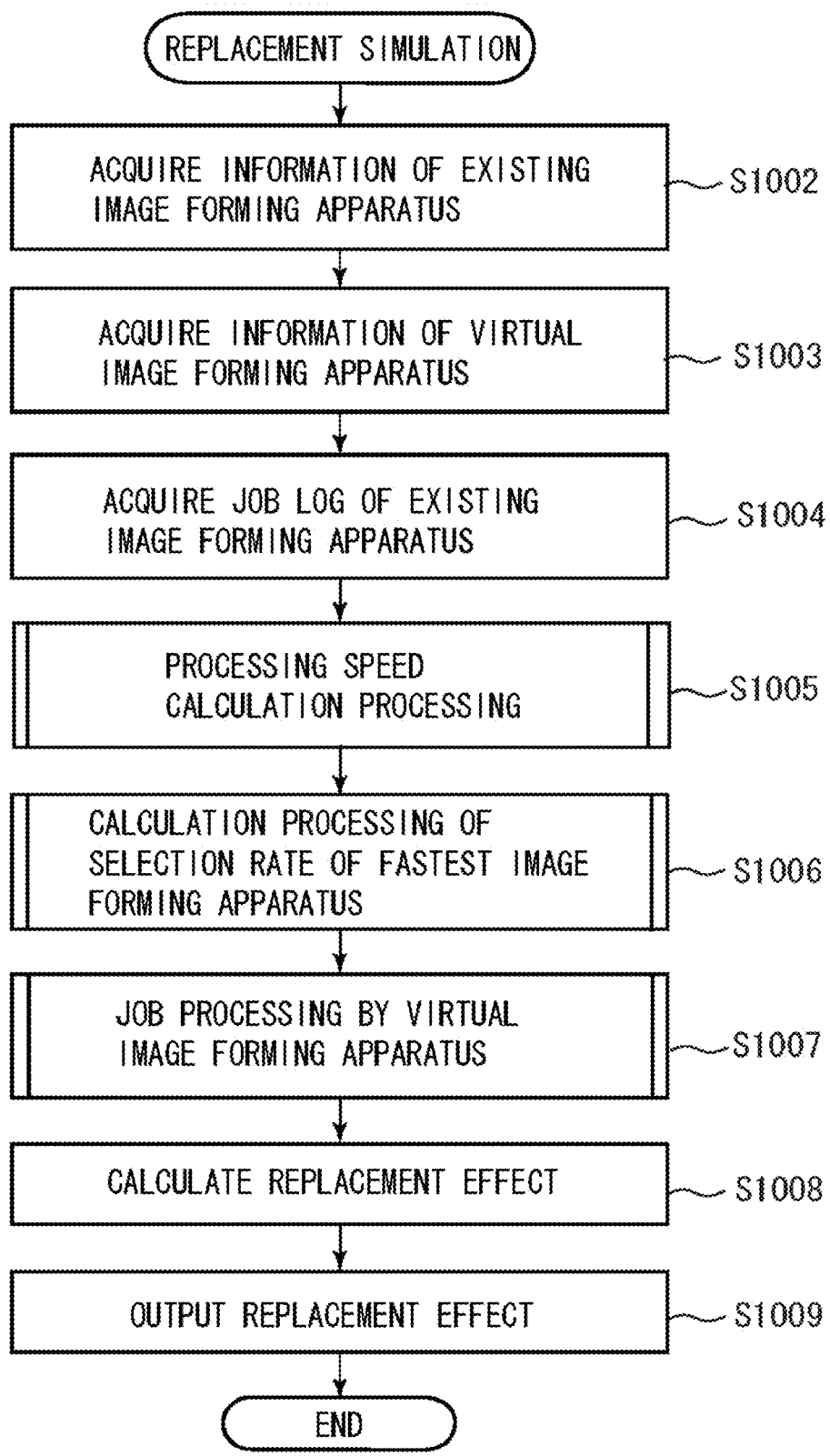
FIG. 10 is a flowchart illustrating an example of a data processing procedure in the information processing apparatus according to an exemplary embodiment of the present invention.

FIG. 10 is a flowchart illustrating an example of a data processing procedure in the information processing apparatus according to an exemplary embodiment of the present invention. This example is a processing procedure of the replacement simulation for the image forming apparatuses in the replacement simulation apparatus 104 illustrated in FIG. 1. The processing is executed by the CPU 201 of the replacement simulation apparatus 104 based on instructions of program code (including program code corresponding to the function of the simulation unit 704).

Figure 11:
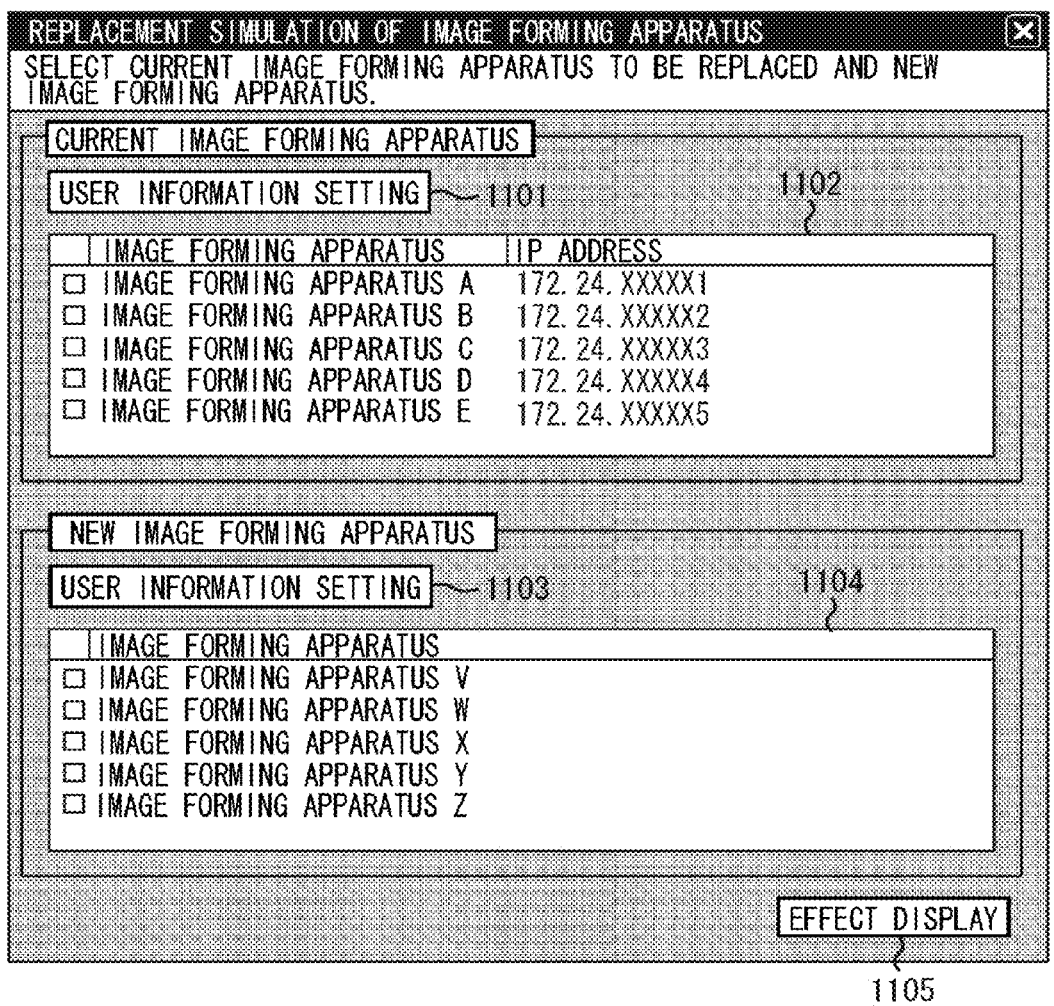
FIG. 11 illustrates an example of a user interface (UI) screen displayed by the host computer when replacement simulation processing is performed according to an exemplary embodiment of the present invention.

When the simulation unit 704 starts the replacement simulation, the simulation unit 704 transmits information for displaying a UI screen to allow the user to select existing image forming apparatuses to be replaced to the host computer 101. Here, a UI screen illustrated in FIG. 11 is displayed on a display section of the host computer 101 via a browser, and the user is allowed to select existing image forming apparatuses to be replaced. Further, in FIG. 11, the user is allowed to select virtual image forming apparatuses by which to replace the existing image forming apparatuses selected by the user.

In step S1002, the simulation unit 704 acquires identification information for identifying the existing image forming apparatuses selected as replacement targets as described above. In step S1003, the simulation unit 704 acquires identification information for identifying the virtual image forming apparatuses selected as substitutes of the existing image forming apparatuses.

In step S1004, the job log acquisition unit 702 acquires job logs of the existing image forming apparatuses by communicating via a predetermined protocol.

In step S1005, the simulation unit 704 performs processing to calculate processing speeds of virtual image forming apparatuses. Details of the processing speed calculation processing will be described below.

In step S1006, the simulation unit 704 obtains a rate at which the user selects the image forming apparatus having the fastest processing speed, by using the job logs of the existing image forming apparatuses. Details of the selection rate calculation processing of the fastest image forming apparatus will be described below.

In step S1007, the simulation unit 704 performs a simulation in which the job logs of the existing image forming apparatuses are processed by the virtual image forming apparatuses. The simulation unit 704 stores information calculated in a case where jobs of the job logs acquired in step S1004 from the image forming apparatuses selected by the user are executed by the virtual image processing apparatuses in a storage apparatus. Details of the job processing simulation in the virtual image processing apparatuses will be described below.

In step S1008, the simulation unit 704 compares a result of analysis in which the analysis processing unit 703 analyzes the job logs of the existing image processing apparatuses selected by the user and a result of analysis in which the analysis processing unit 703 analyzes the job logs of the virtual image processing apparatuses, and calculates the replacement effects. The replacement effects are calculated based on, for example, an operation rate of the selected image forming apparatus, a processing time required for processing the job, and a waiting time required until the job is executed. For the processing time and the waiting time, by calculating on a cost-plus basis, costs which can be reduced when replacing the existing image forming apparatuses by the virtual image forming apparatuses may be calculated as numeral values.

Figure 12:
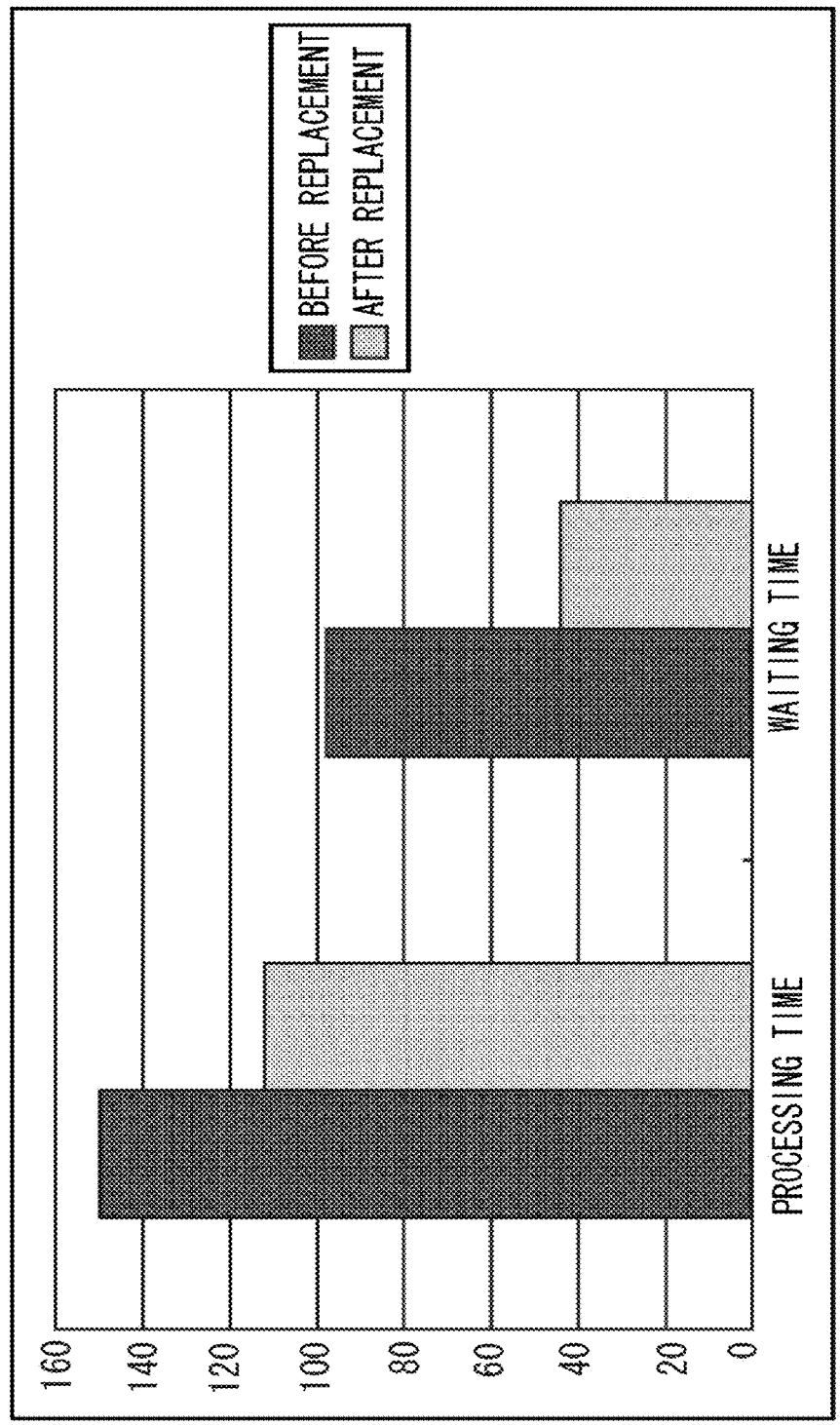
FIGS. 12A and 12B illustrate an example of replacement effects displayed by the host computer illustrated in FIG. 1.

In step S1009, the simulation unit 704 outputs the above-mentioned analysis result and calculation result to display a UI screen illustrated in FIGS. 12A and 12B on a display apparatus of the host computer 101. After that, the replacement simulation processing ends. The UI screen may be displayed on the display apparatus of the replacement simulation apparatus 104, the UI screen may be printed by a selected image forming apparatus, and also the UI screen may be converted into a specified file to be transmitted to a user's mobile terminal. The specified file may be a portable document format (PDF) file.

FIG. 11 illustrates an example of the UI screen displayed by the host computer 101 when the replacement simulation processing is performed according to an exemplary embodiment of the present invention.

Referring to the example illustrated in FIG. 11, a user information setting button 1101 is for the existing image forming apparatuses. The user information setting button 1101 is used for setting user information of the existing image forming apparatuses. The set user information is transmitted to and then stored in the user information management unit 706.

A list 1102 lists the existing image forming apparatuses in the system. The existing image forming apparatuses to be replaced can be selected from the list. The user can select a plurality of existing image forming apparatuses by checking the checkboxes. In the present exemplary embodiment, for example, as a list of existing image forming apparatuses, image forming apparatuses on the network which share a part of domain with an IP address of the user's host computer are displayed.

A user information setting button 1103 is for the virtual image forming apparatuses. The user information setting button 1103 is used for setting user information of the virtual image forming apparatuses. The set user information is stored in the user information management unit 706.

A list 1104 lists the virtual image forming apparatuses. Virtual image forming apparatuses substituting for the existing image forming apparatuses selected in the list 1102 of the existing image forming apparatuses are selected. The user can select a plurality of virtual image forming apparatuses by checking the checkboxes.

A replacement effect display button 1105 displays the replacement effects. When a user presses the replacement effect display button 1105, the simulation unit 704 starts the replacement simulation.

As an example, a general flow of a replacement simulation in which two existing image forming apparatuses A and B are replaced by three image forming apparatuses X, Y, and Z will be described.

First, via the UI of FIG. 11, the user selects the image forming apparatus A and the image forming apparatus B in the existing image forming apparatus list 1102, and selects the image forming apparatus X, the image forming apparatus Y, and the image forming apparatus Z in the virtual image forming apparatus list 1104.

When the user information of each image forming apparatus is not set, the user information can be set by using the user information setting buttons 1101 and 1103.

When the replacement effect display button 1105 is pressed, the replacement simulation is started.

In the replacement simulation, first, the job logs of the image forming apparatuses A and B are acquired.

Next, processing speeds used in simulations of the virtual image forming apparatuses X, Y and Z are calculated.

Next, a rate at which the user indicated in the acquired job log selects the image forming apparatus having the fastest processing speed is obtained.

Next, a simulation in which the job logs of the image forming apparatuses A and B are processed by the image forming apparatuses X, Y, and Z is performed. Finally, analysis results of the job logs of the image forming apparatuses A and B and analysis results of the job logs of the image forming apparatuses X, Y, and Z are compared, and the replacement effects are calculated and displayed.

FIGS. 12A and 12B illustrate an example of the replacement effects displayed by the host computer 101 illustrated in FIG. 1.

In FIGS. 12A and 12B, a table 1201 illustrates processing times, user waiting times, increase and decrease in the processing time and the user waiting time, and cost effects of the image forming apparatuses before and after the replacement. The cost effects are calculated by converting the increased or decreased times caused by the replacement into labor costs, for example.

A graph 1202 illustrates the processing times and the waiting times before and after the replacement.

By using the table 1201 and the graph 1202, amounts of changes in the processing times of the image forming apparatuses and the user waiting times caused by the replacement of the image forming apparatuses, and their cost effects can be recognized.

The processing speed calculation processing of the virtual image forming apparatus in step S1005 of FIG. 10 will be described below in detail.

Figure 13:
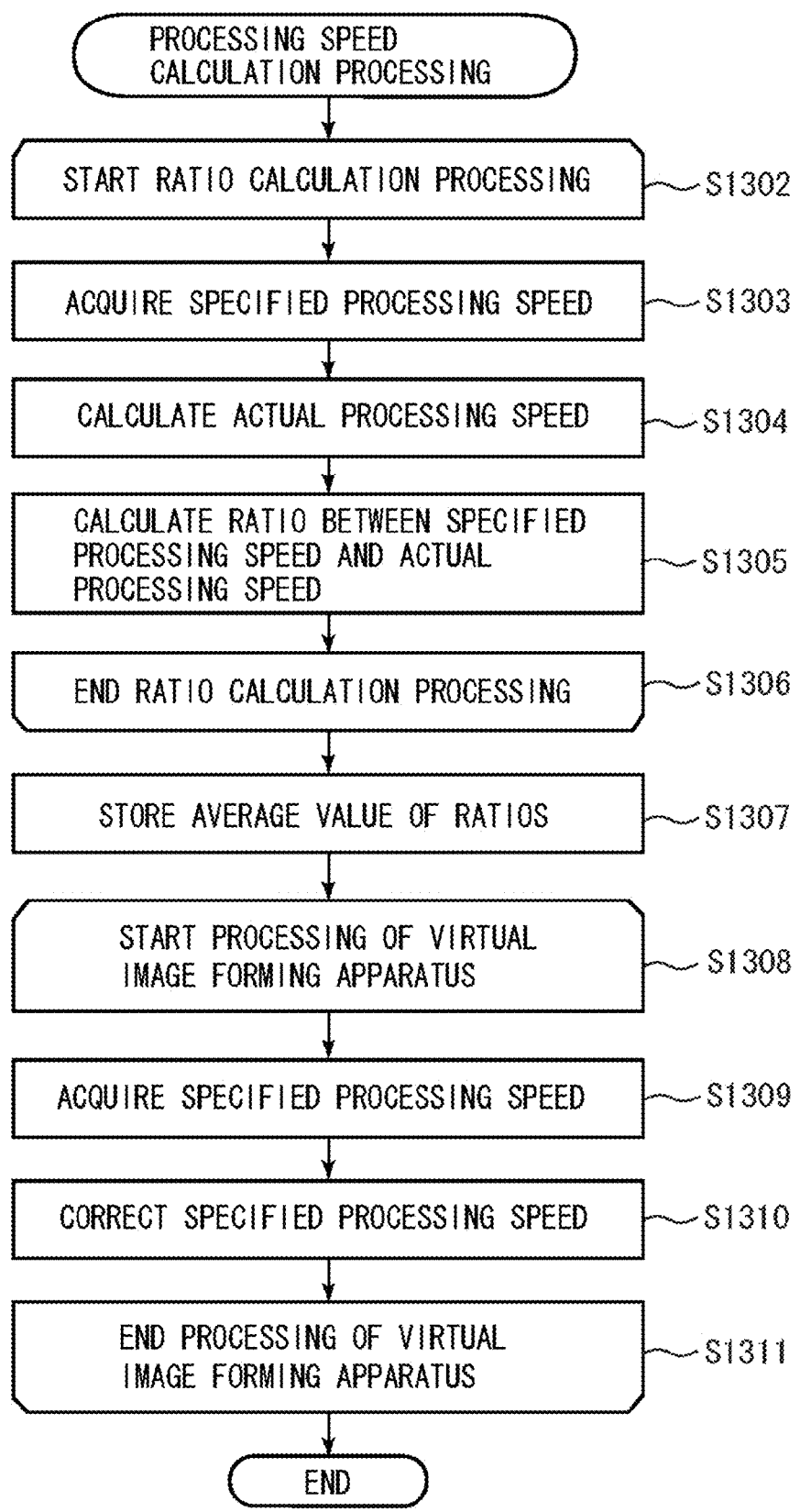
FIG. 13 is a flowchart illustrating an example of a data processing procedure in the information processing apparatus according to an exemplary embodiment of the present invention.

FIG. 13 is a flowchart illustrating an example of a data processing procedure in the information processing apparatus according to an exemplary embodiment of the present invention. This example is a calculation processing procedure of the processing speed of the virtual image forming apparatus by the replacement simulation apparatus 104. The processing is executed by the CPU 201 of the replacement simulation apparatus 104 based on instructions of program code.

After starting the processing speed calculation processing in step S1005, the simulation unit 704 performs processing from step S1303 to step S1305 on the job logs acquired in step S1004, by a loop processing between steps S1302 and S1306, which are calculation start and end steps.

In step S1303, the simulation unit 704 acquires a processing speed of the specification (hereinafter, specified processing speed) corresponding to the job log setting from the performance information management unit 705 for the image forming apparatus, and temporarily stores the specified processing speed in a predetermined storage area of the simulation unit 704.

In step S1304, the simulation unit 704 calculates, from the job log, an actual processing speed (hereinafter, actual processing speed) of the image forming apparatus which processed the job log. This actual processing speed is also temporarily stored in a predetermined storage area of the replacement simulation apparatus 104.

When the specified processing speed is represented by PPM, the actual processing speed is obtained by the following formula. PPM is one of performance measures for a printer, and represents the number of pages which a printer can print per minute.

Actual processing speed=1 minute(60 seconds)/((processing end time−processing start time)/the number of printed sides)

For example, the actual processing speed of a job log whose processing start time is 12:00:00, processing end time is 12:01:04, and number of printed sides is 30, is "28".

In step S1305, the simulation unit 704 calculates a ratio between the specified processing speed acquired and stored in step S1303 and the actual processing speed calculated in step S1304. The ratio is obtained by the following formula:

Ratio=actual processing speed/specified processing speed

For example, when the specified processing speed is "40" in PPM and the actual processing speed is "28" in PPM, the ratio is "0.7". This ratio is stored in association with settings, such as a job type of the job log, a color mode, a paper size, and so on.

In step S1306, when it is determined that processing for all of the acquired job logs ends, the process proceeds to step S1307.

In step S1307, the simulation unit 704 calculates an average value of the ratios calculated in step S1304 in association with a job type, a color mode, a paper size, and so on, and stores the average value in the storage apparatus.

FIG. 14 illustrates the average values of ratios between a specified processing speed and an actual processing speed of the existing image forming apparatus, the average values being calculated and stored in step S1307.

In the example illustrated in FIG. 14, average values of ratios between a specified processing speed and an actual processing speed of the existing image forming apparatus are managed using the job type, the color mode, and the paper size.

Next, the simulation unit 704 performs processing of steps S1309 and S1310 on the virtual image forming apparatuses selected in step S1003, by a loop processing between step S1308 and step S1311, which are start and end of correction processing of the specified processing speeds.

In step S1309, the simulation unit 704 acquires a specified processing speed of a selected virtual image forming apparatus from the performance information management unit 705 for the image forming apparatuses.

In step S1310, the simulation unit 704 corrects the specified processing speed of the virtual image forming apparatus, which is acquired in step S1309, by using the average values of ratios between the specified processing speed and the actual processing speed, which are stored in the storage apparatus in step S1307. The corrected processing speed of the virtual image forming apparatus is obtained by the following formula. The following formula is obtained according to each setting, such as the job type, the color mode, and so on.

Processing speed of virtual image forming apparatus=specified speed×ratio

For example, when the specified processing speed of the virtual image forming apparatus is "50" in PPM and the average value of the ratios is "0.7", the processing speed of the virtual image forming apparatus is "35" in PPM.

FIG. 15 illustrates an example of the corrected processing speeds of the virtual image forming apparatuses in the exemplary embodiment of the present invention.

In the example illustrated in FIG. 15, the corrected processing speeds of the virtual image forming apparatuses are managed using the job type, the color mode, and the paper size.

Next, when it is determined that the correction processing for all of the virtual image forming apparatuses ends in step S1311, the processing speed calculation processing ends.

The selection rate calculation processing regarding a rate at which the user selects the fastest image forming apparatus in step S1006 illustrated in FIG. 10 will be described below in detail.

Figure 16:
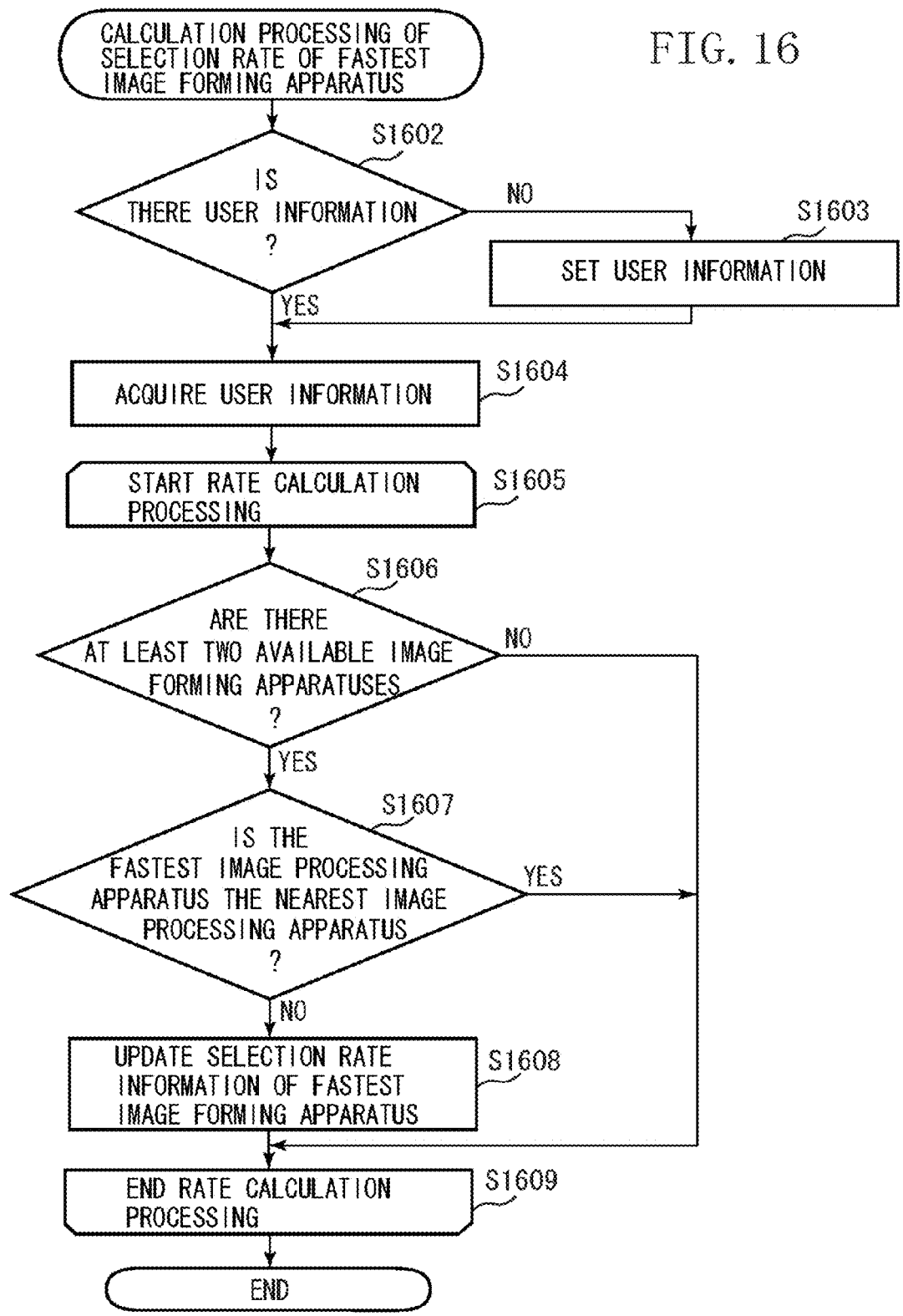
FIG. 16 is a flowchart illustrating an example of a data processing procedure in the information processing apparatus according to an exemplary embodiment of the present invention.

FIG. 16 is a flowchart illustrating an example of a data processing procedure in the information processing apparatus according to an exemplary embodiment of the present invention. This example is a procedure of the selection rate calculation processing performed by the replacement simulation apparatus 104 regarding a rate at which the user selects the fastest image forming apparatus. The processing is executed by the CPU 201 of the replacement simulation apparatus 104 based on instructions of program code.

When the selection rate calculation processing of the fastest image forming apparatus starts, the simulation unit 704 determines whether the user information management unit 706 stores the user information in step S1602. When the simulation unit 704 determines that the user information management unit 706 stores the user information (YES in step S1602), the process proceeds to step S1604. When the simulation unit 704 determines that the user information management unit 706 does not store the user information (NO in step S1602), the process proceeds to step S1603.

In step S1603, the simulation unit 704 sends a setting request to the host computer 101 to prompt the user (administrator) to set the user information, and the process proceeds to step S1604. Here, the user is prompted to set the positional relation information between each user and each existing image forming apparatus as illustrated in FIG. 9. In step S1604, the simulation unit 704 acquires the user information from the user information management unit 706.

Next, the simulation unit 704 performs processing from step S1606 to step S1608 on the job logs acquired in step S1004, by a loop processing between step S1605 and step S1609, which are start and end steps of calculating the rate at which the user selects the fastest image forming apparatus.

In step S1606, the simulation unit 704 determines whether the job of the job log can be processed by at least two image forming apparatuses available to the user. When the simulation unit 704 determines that the job can be processed by at least two image forming apparatuses (YES in step S1606), the process proceeds to step S1607. The image forming apparatus that can process the job is determined according to whether the image forming apparatus has a function to execute the setting of the job.

When the simulation unit 704 determines that the job cannot be processed by at least two image forming apparatuses, in other words, the job can be processed only by the image forming apparatus that has acquired the job log (NO in step S1606), the process proceeds to step S1609. In this way, when the job can be processed by only one image forming apparatus, the job can be excluded from the processing targets of the selection rate calculation of the fastest image forming apparatus.

In step S1607, the simulation unit 704 determines whether the image forming apparatus that can process the job of the job log fastest of all of the image forming apparatuses available to the user is the nearest image forming apparatus to the user, with reference to FIG. 9. When the simulation unit 704 determines that the image forming apparatus that can process the job fastest is the nearest image forming apparatus to the user (YES in step S1607), the process proceeds to step S1609.

Here, when the image forming apparatus that can process the job fastest is the nearest image forming apparatus to the user, the job is excluded from the processing targets of the selection rate calculation of the fastest image forming apparatus. In other words, in the present exemplary embodiment, when it cannot be determined whether the reason why the user selects the image forming apparatus to process the job is because the processing speed is fast or because the user's location is near the installation location of the image forming apparatus, the job of the job log is excluded from the rate calculation.

On the other hand, in step S1607, when the simulation unit 704 determines that the image forming apparatus that can process the job fastest is not the nearest image forming apparatus to the user (NO in step S1607), the process proceeds to step S1608.

In step S1608, the simulation unit 704 updates information of the selection rate of the fastest image forming apparatus for each user, and stores the information in the storage apparatus.

FIG. 17 illustrates an example of the selection rates of the fastest image forming apparatus for each user managed by the information processing apparatus according to an exemplary embodiment of the present invention. This example is an example of the selection rates of the fastest image forming apparatus for each user, which are stored in the storage apparatus in step S1608.

In FIG. 17, the selection rate of the fastest image forming apparatus is calculated for each value of the number of sheets×the number of copies to print set in the job, and stored in the storage apparatus. By managing such information, the lower limits of the number of sheets to print by which the user determines to use the image forming apparatus having a fast processing speed are recognized.

The selection rate of the fastest image forming apparatus is obtained by the following formula. The number of all target jobs in the formula represents the number of jobs that are used to calculate the selection rate of the fastest image forming apparatus.

The selection rate of the fastest image forming apparatus=the number of jobs processed by the fastest image forming apparatus/the number of all target jobs Next, when it is determined that the processing of all acquired jobs ends in step S1609, the selection rate calculation processing of the fastest image forming apparatus ends.

The job processing in the virtual image forming apparatus in step S1007 illustrated in FIG. 10 will be described below in detail.

Figure 18:
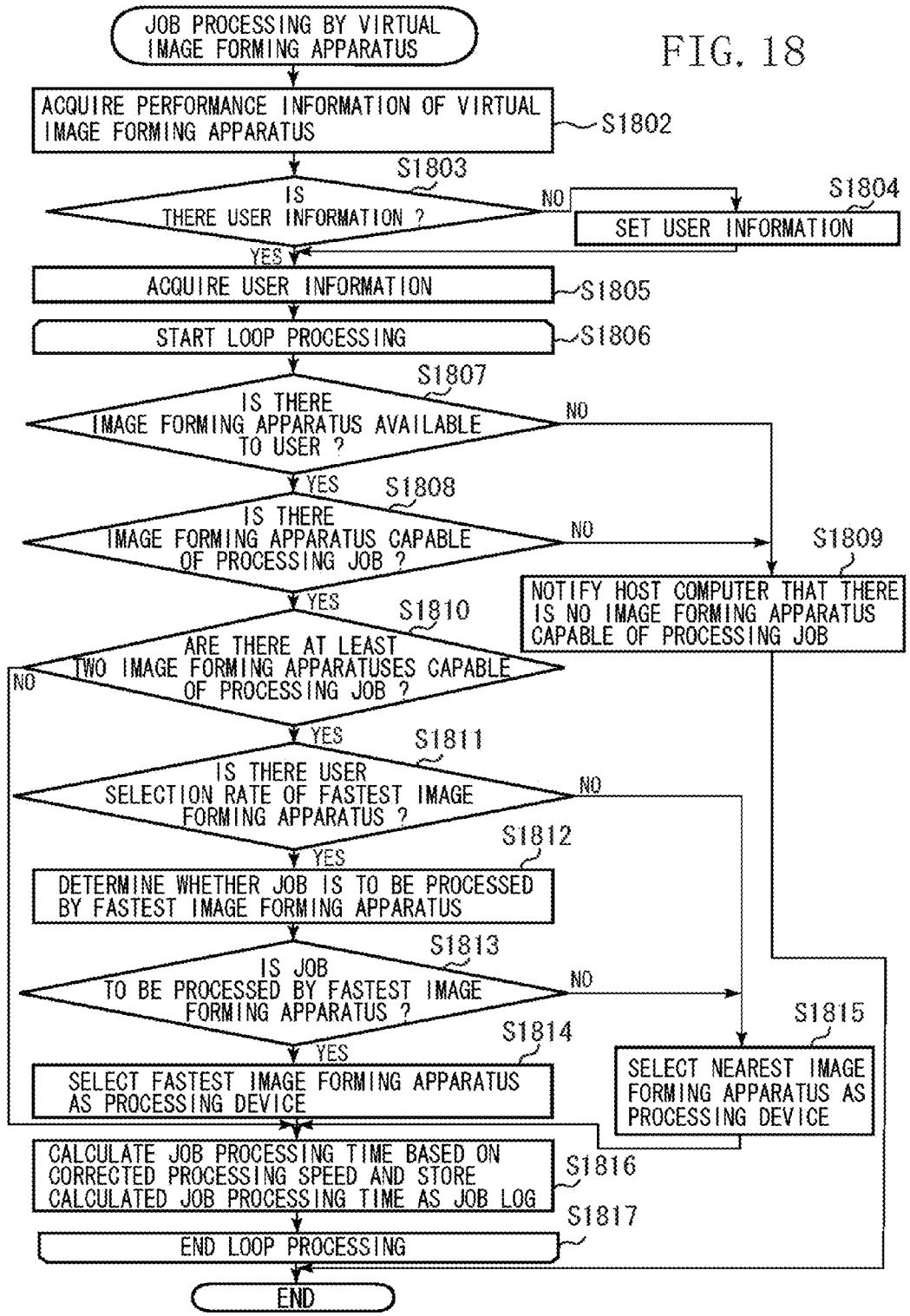
FIG. 18 is a flowchart illustrating an example of a data processing procedure in the information processing apparatus according to an exemplary embodiment of the present invention.

FIG. 18 is a flowchart illustrating an example of a data processing procedure in the information processing apparatus according to an exemplary embodiment of the present invention. This example is a processing procedure by which the replacement simulation apparatus 104 performs a simulation in which a job of a job log is processed by a virtual image forming apparatus. The processing is executed by the CPU 201 of the replacement simulation apparatus 104 based on instructions of program code.

In step S1802, the simulation unit 704 acquires performance information about the virtual image forming apparatus from the performance information management unit 705.

In step S1803, the simulation unit 704 determines whether the user information management unit 706 stores the user information. When the simulation unit 704 determines that the user information management unit 706 stores the user information (YES in step S1803), the process proceeds to step S1805. When the simulation unit 704 determines that the user information management unit 706 does not store the user information (NO in step S1803), the process proceeds to step S1804.

In step S1804, the simulation unit 704 sends a setting request to the host computer to prompt the user (administrator) to set the user information, and the process proceeds to step S1805. Here, the user is prompted to set the positional relation information between each user and each virtual image forming apparatus as illustrated in FIG. 9. In step S1805, the simulation unit 704 acquires the user information from the user information management unit 706.

Next, the simulation unit 704 performs processing from step S1807 to step S1816 on the job logs acquired in step S1004, by a loop processing between step S1806 and step S1817 which is a simulation on the virtual image forming apparatuses.

In step S1807, the simulation unit 704 determines whether there are any image forming apparatuses available to the user illustrated in the job log, by using the user information acquired in step S1805. When the simulation unit 704 determines that there are one or more image forming apparatuses available to the user (YES in step S1807), the process proceeds to step S1808. When the simulation unit 704 determines that there is no image forming apparatus available to the user (NO in step S1807), the process proceeds to step S1809.

In step S1808, the simulation unit 704 determines whether there are any image forming apparatuses that can process the job in the image forming apparatuses available to the user, by using the performance information of the image forming apparatuses acquired in step S1802. For example, this determination corresponds to determining whether an available image forming apparatus has an attribute of color printing when the job is a job for color printing.

When the simulation unit 704 determines that there are one or more image forming apparatuses that can process the job (YES in step S1808), the process proceeds to step S1810. When the simulation unit 704 determines that there is no image forming apparatus that can process the job (NO in step S1808), the process proceeds to step S1809.

In step S1809, the simulation unit 704 notifies the host computer 101 operated by the user that there is no image forming apparatus that can process the job in the available image forming apparatuses, and ends the job processing of the virtual image forming apparatus. The notification content is transmitted from the replacement simulation apparatus 104 and displayed by the browser of the host computer 101 in a dialog format, for example. At this time, by displaying information of the job log corresponding to the job that cannot be processed, the user may be allowed to recognize the function that cannot be processed by the virtual image forming apparatus to be replaced.

In step S1810, the simulation unit 704 determines whether there are two or more image forming apparatuses that can process the job in the image forming apparatuses available to the user. When the simulation unit 704 determines that there are two or more image forming apparatuses (YES in step S1810), the process proceeds to step S1811. When the simulation unit 704 determines that there is only one image forming apparatus that can process the job (NO in step S1810), the process proceeds to step S1816.

In step S1811, the simulation unit 704 determines whether there is the information of the selection rate of the fastest image forming apparatus corresponding to the user indicated in the job log, in the information of the user selection rate of the fastest image forming apparatus calculated in step S1006. When the simulation unit 704 determines that there is the information of the selection rate of the fastest image forming apparatus corresponding to the user indicated in the job log (YES in step S1811), the process proceeds to step S1812.

On the other hand, in step S1811, when the simulation unit 704 determines that there is no information of the selection rate of the fastest image forming apparatus corresponding to the user indicated in the job log (NO in step S1811), the process proceeds to step S1815.

In step S1812, the simulation unit 704 determines whether the job is to be processed by the fastest image forming apparatus based on the user selection rate of the fastest image forming apparatus calculated in step S1006. For example, the simulation unit 704 makes the determination based on an arbitrary formula for selecting the fastest image forming apparatus or the nearest image forming apparatus depending on the selection rate of the fastest image forming apparatus. When the selection rate of the fastest image forming apparatus is 30%, the simulation unit 704 determines that the job is processed by using the fastest image forming apparatus at 30 percent probability.

In step S1813, the simulation unit 704 determines whether the job is to be processed by the fastest image forming apparatus based on the determination result in step S1812. When the simulation unit 704 determines that the job is to be processed by the fastest image forming apparatus (YES in step S1813), the process proceeds to step S1814. When the simulation unit 704 determines the job is not to be processed by the fastest image forming apparatus (NO in step S1813), the process proceeds to step S1815.

In step S1814, the simulation unit 704 determines that a processing device which should process the job of the job log is the fastest image forming apparatus having the fastest processing speed indicated in the performance information of the image forming apparatuses acquired in step S1802.

On the other hand, in step S1815, the simulation unit 704 determines that a processing device which should process the job of the job log is the nearest image forming apparatus to the user indicated in the job log, by using the user information acquired in step S1805.

In step S1816, the simulation unit 704 calculates a processing time of the job of the job log by using the processing speed of the virtual image forming apparatus calculated in step S1005, and stores the processing time as a job log in a predetermined area in the storage apparatus.

Next, in step S1817, when the simulation unit 704 determines that the processing of all of the job logs ends, the simulation unit 704 ends the job processing in the virtual image forming apparatuses.

In this way, when a job is processed by an image forming apparatus selected by the user, even if the processing speed of the image forming apparatus varies depending on characteristics of printing output by the user, the replacement simulation of the image forming apparatuses can be performed in a condition in which the characteristics are reflected.

Furthermore, the replacement simulation of the image forming apparatuses can be also performed after reflecting user's selection criteria for selecting the image forming apparatuses.

FIG. 19 illustrates a memory map of a storage medium storing various data processing programs readable by the information processing apparatus according to an exemplary embodiment of the present invention.

In the storage medium, information for managing the programs stored in the storage medium, for example, version information, and author names are also stored, and information depending on the OS which reads the programs, for example, icons which identify the programs may also stored.

In addition, data accompanying the various programs are also managed in a directory in the above storage medium. Furthermore, a program for installing the various programs on a computer, and a decompression program for a case where a program to be installed is compressed may also be stored.

The functions illustrated in FIGS. 10, 13, 16, and 18 in the exemplary embodiment may be executed by a host computer by using a program installed from outside of the computer. In this case, the present invention is also applied even when an information group including a program is provided to an output apparatus by a storage medium, such as a compact disc read-only memory (CD-ROM), a flash memory, and a floppy disk (FD), or from an external storage medium via a network.

In this way, a storage medium storing program code of software for realizing functions of the exemplary embodiment is provided to a system or an apparatus. A computer (or CPU or micro processing unit (MPU)) of the system or the apparatus can read and execute the program code stored in the storage medium.

In this case, the program code read from the storage medium realizes the novel functions of the present invention, so that the storage medium storing the program code constitutes the present invention.

Therefore, any program format, such as object code, a program executed by an interpreter, and script data provided to an OS can be used.

As a storage medium for supplying programs, for example, a floppy disk, a hard disk, an optical disk, a magnetic optical disk, a magneto-optical disc (MO), a CD-ROM, a compact disc recordable (CD-R), a compact disc rewritable (CD-RW), a magnetic tape, a non-volatile memory card, a ROM, a digital versatile disc (DVD), and the like can be used.

In this case, the program code read from the storage medium realizes the novel functions of the exemplary embodiment, so that the storage medium storing the program code constitutes the present invention.

As a method for supplying programs, a client computer is connected to a homepage (website) on the Internet by using a browser of the client computer. The programs can be supplied by downloading the computer program of the exemplary embodiment of the present invention or a file which is compressed and includes a function of automatic installation to a recording medium such as a hard disk. In addition, the exemplary embodiment of the present invention can be realized by dividing the program code which constitutes the programs of the exemplary embodiment of the present invention into a plurality of files and downloading each of the files from different homepages. In other words, a world wide web (WWW) server or a file transfer protocol (FTP) server which allows a plurality of users to download a program file for realizing function processing of the exemplary embodiment of the present invention with a computer is also included in the present invention.

In addition, the program of the exemplary embodiment of the present invention is encrypted and stored in a storage medium, such as a CD-ROM, the storage mediums are distributed to users, and users who satisfy a predetermined condition are allowed to download key information to solve the encryption from a homepage via the Internet. The exemplary embodiment of the present invention can be realized by executing the encrypted program using the key information to install the program on a computer.

In addition, the functions of the exemplary embodiment are not only realized by executing the program code read by the computer. For example, based on instructions of the program code, an OS or the like operating on the computer performs a part or the whole of the actual processing. Then, a case where the functions of the exemplary embodiment are realized by the processing is included in the present invention.

Furthermore, the program code read from the storage medium can be written into a memory included in a function expansion board inserted into a computer or a function expansion unit connected to a computer. Then, based on instructions of the program code, a CPU included in the function expansion board or the function expansion unit performs a part or the whole of the actual processing. The functions of the exemplary embodiment can be realized by the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-148958 filed Jun. 6, 2008, which is hereby incorporated by reference herein in its entirety.

What is claimed is:

1. An information processing apparatus for performing, in a system including an image forming apparatus, a simulation of a case where the image forming apparatus is replaced by another image forming apparatus, the information processing apparatus comprising:
   a storage unit configured to store a specified processing speed, which is a job processing speed specified in a product specification, for each of a plurality of image forming apparatuses;
   an acquisition unit configured to acquire a job log of the image forming apparatus included in the system;
   a calculation unit configured to calculate an actual job processing speed of the image forming apparatus included in the system based on the job log acquired by the acquisition unit;
   a ratio calculation unit configured to calculate a ratio between the specified processing speed stored in the storage unit and the actual job processing speed calculated by the calculation unit, of the image forming apparatus included in the system;
   a correction unit configured to acquire a specified processing speed of the another image forming apparatus usable for replacement in the simulation from the storage unit and to correct the acquired specified processing speed using the ratio calculated by the ratio calculation unit;
   a processing unit configured to perform a simulation in which a job based on the job log acquired by the acquisition unit is processed at the specified processing speed of the another image forming apparatus corrected by the correction unit;
   a log storage unit configured to store a result of the simulation performed by the processing unit as a job log; and
   an output unit configured to output an analysis result of analyzing the job log acquired by the acquisition unit and an analysis result of analyzing the job log stored by the log storage unit.

2. The information processing apparatus according to claim 1, wherein the analysis results output from the output unit include a processing time required for processing a job and a waiting time required for waiting for a job to be processed after another job is processed.

3. The information processing apparatus according to claim 1, further comprising a rate calculation unit configured to calculate a selection rate at which a user who uses the image forming apparatus included in the system selects an image forming apparatus having a fastest processing speed to process a job, based on the job log acquired by the acquisition unit, when there are a plurality of other image processing apparatuses usable for replacement in the simulation,
   wherein the processing unit performs a simulation in which the processing unit selects one of the plurality of other image processing apparatuses based on the selection rate calculated by the rate calculation unit, and processes the job based on the job log acquired by the acquisition unit at a specified processing speed of the selected other image forming apparatus corrected by the correction unit.

4. A method for an information processing apparatus for performing, in a system including an image forming apparatus, a simulation of a case where the image forming apparatus is replaced by another image forming apparatus, the method comprising:
   storing a specified processing speed, which is a job processing speed specified in a product specification, for each of a plurality of image forming apparatuses;
   acquiring a job log of the image forming apparatus included in the system;
   calculating an actual job processing speed of the image forming apparatus included in the system based on the acquired job log;
   calculating a ratio between the stored specified processing speed and the calculated actual job processing speed of the image forming apparatus included in the system;
   acquiring a stored specified processing speed of the another image forming apparatus usable for replacement in the simulation and correcting the acquired specified processing speed using the calculated ratio;
   performing a simulation in which a job based on the acquired job log is processed at the corrected specified processing speed of the another image forming apparatus;
   storing a result of the performed simulation as a job log; and
   outputting an analysis result of analyzing the acquired job log of the image forming apparatus and an analysis result of analyzing the stored job log.

5. The method according to claim 4, wherein the output analysis results include a processing time required for processing a job and a waiting time required for waiting for a job to be processed after another job is processed.

6. The method according to claim 4, further comprising:

calculating a selection rate at which a user who uses the image forming apparatus included in the system selects an image forming apparatus having a fastest processing speed to process a job based on the acquired job log when there are a plurality of other image processing apparatuses usable for replacement in the simulation; and performing a simulation in which one of the plurality of other image processing apparatuses is selected based on the calculated selection rate, and the job based on the acquired job log is processed at a corrected specified processing speed of the selected other image forming apparatus.

7. A non-transitory computer-readable storage medium storing a program for making a computer execute a method for an information processing apparatus for performing, in a system including an image forming apparatus, a simulation of a case where the image forming apparatus is replaced by another image forming apparatus, the method comprising:

storing a specified processing speed, which is a job processing speed specified in a product specification, for each of a plurality of image forming apparatuses;

acquiring a job log of the image forming apparatus included in the system;

calculating an actual job processing speed of the image forming apparatus included in the system based on the acquired job log;

calculating a ratio between the stored specified processing speed and the calculated actual job processing speed of the image forming apparatus included in the system;

acquiring a stored specified processing speed of the another image forming apparatus usable for replacement in the simulation and correcting the acquired specified processing speed using the calculated ratio;

performing a simulation in which a job based on the acquired job log is processed at the corrected specified processing speed of the another image forming apparatus;

storing a result of the performed simulation as a job log; and outputting an analysis result of analyzing the acquired job log of the image forming apparatus and an analysis result of analyzing the stored job log.

* * * * *